US00RE47146E

(19) United States
(12) Reissued Patent
Muraki

(10) Patent Number: US RE47,146 E
(45) Date of Reissued Patent: Nov. 27, 2018

(54) IMAGE RECORDING APPARATUS

(71) Applicant: Brother Kogyo Kabushiki Kaisha, Nagoya-shi, Aichi-ken (JP)

(72) Inventor: Motohito Muraki, Nagoya (JP)

(73) Assignee: BROTHER KOGYO KABUSHIKI KAISHA, Nagoya-Shi, Aichi-Ken (JP)

(21) Appl. No.: 15/214,976

(22) Filed: Jul. 20, 2016

Related U.S. Patent Documents

Reissue of:
(64) Patent No.: 8,786,647
Issued: Jul. 22, 2014
Appl. No.: 13/434,500
Filed: Mar. 29, 2012

(30) Foreign Application Priority Data

Sep. 30, 2011 (JP) ..... 2011-216696

(51) Int. Cl.
*B41J 2/385* (2006.01)
*H04N 1/00* (2006.01)

(52) U.S. Cl.
CPC ..... *H04N 1/00236* (2013.01); *H04N 1/00302* (2013.01); *H04N 1/00525* (2013.01);
(Continued)

(58) Field of Classification Search
CPC ..... H04N 1/00236; H04N 1/00302; H04N 1/00525; H04N 2201/0093;
(Continued)

(56) References Cited

U.S. PATENT DOCUMENTS 4,580,150 A 4/1986 Tazaki
6,249,296 B1 * 6/2001 Nemura ..... 347/138
(Continued)

FOREIGN PATENT DOCUMENTS

EP 1510350 A1 3/2005
GB 2361670 A 10/2001
(Continued)

OTHER PUBLICATIONS

Japan Patent Office, Notification of Reason for Refusal for Japanese Patent Application No. 2005-364688 (counterpart to co-pending U.S. Appl. No. 11/612,892), dispatched Feb. 22, 2011.
(Continued)

*Primary Examiner* — Minh T Nguyen
(74) *Attorney, Agent, or Firm* — Merchant & Gould P.C.

(57) ABSTRACT

An image recording apparatus, including: a housing; an image recording portion held by the housing; a control board having a mounting face and disposed in the housing such that the mounting face extends along a perpendicular plane perpendicular to a height direction, a control circuit for controlling the image recording portion being provided on the control board; and a communication board having a mounting face and disposed in the housing such that the mounting face extends along the perpendicular plane, such that the communication board is distant from the control board in a direction along the perpendicular plane, and such that the communication board is located within a height range ranging to the control board from a distal end of a highest one of mounted components mounted on the control board, an interface circuit to be connected to a telephone line being provided on the communication board.

18 Claims, 11 Drawing Sheets

(52) U.S. Cl.
CPC ..... *H04N 2201/0039* (2013.01); *H04N 2201/0041* (2013.01); *H04N 2201/0049* (2013.01); *H04N 2201/0063* (2013.01); *H04N 2201/0093* (2013.01)

(58) Field of Classification Search
CPC ... H04N 2201/0063; H04N 2201/0039; H04N 2201/0041; H04N 2201/0049
USPC ..... 347/138, 108, 129, 152, 170
See application file for complete search history.

(56) References Cited

U.S. PATENT DOCUMENTS

| | | | | |
|---|---|---|---|---|
| 6,612,763 | B1 * | 9/2003 | Yoshihara | B41J 29/02 271/3.19 |
| 7,822,358 | B2 * | 10/2010 | Imada et al. | 347/138 |
| 7,871,140 | B2 * | 1/2011 | Ohama | B41J 13/103 347/2 |
| 7,960,037 | B2 * | 6/2011 | Liu | B82Y 10/00 252/301.16 |
| 2001/0026304 | A1 | 10/2001 | Matsuzaki et al. | |
| 2004/0046855 | A1 * | 3/2004 | Saito | 347/138 |
| 2005/0206667 | A1 | 9/2005 | Ohama et al. | |
| 2007/0139462 | A1 | 6/2007 | Tamaki | |
| 2013/0063531 | A1 | 3/2013 | Muraki et al. | |

FOREIGN PATENT DOCUMENTS

| | | | |
|---|---|---|---|
| JP | 2001-270132 | A | 10/2001 |
| JP | 2004-175072 | A | 6/2004 |
| JP | 2005-246883 | A | 9/2005 |
| JP | 2007-168095 | A | 7/2007 |
| JP | 2007-301822 | A | 11/2007 |
| JP | 2008-036898 | A | 2/2008 |
| WO | 99/47356 | A1 | 9/1999 |

OTHER PUBLICATIONS

European Patent Office, European Search Report for EP Application No. 06026104.7 (counterpart to co-pending U.S. Appl. No. 11/612,892) mailed Mar. 2, 2007.

* cited by examiner

IMAGE RECORDING APPARATUS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

The present application *is a reissue of U.S. Pat. No. 8,786,647, issued on Jul. 22, 2014, which further* claims priority from Japanese Patent Application No. 2011-216696, which was filed on Sep. 30, 2011, the disclosure of *both of* which is herein incorporated by reference in [its] *their* entirety.

BACKGROUND OF THE INVENTION

1. Field of the Invention

The present invention relates to an image recording apparatus including: a control board on which is provided a control circuit for controlling operations of an image recording portion; and a communication board on which is provided an interface circuit for connecting between the control circuit and a telephone line.

2. Description of the Related Art

There is conventionally known an image recording apparatus including: an image recording portion for recording an image on a recording medium; a control board on which is provided a control circuit for controlling operations of this image recording portion; and a communication unit including a telephone terminal to which a telephone line is connectable. The communication unit is disposed in a lower portion of a main body of the apparatus so as to be electrically connected with a communication cable to the control board disposed in an upper portion of the main body of the apparatus.

SUMMARY OF THE INVENTION

If an interface circuit for connecting between the control circuit and the telephone line is provided, and a communication board (as the communication unit) on which is mounted a connector to which the telephone line is connectable is disposed in the lower portion of the main body of the apparatus while the control board is disposed in the upper portion of the main body of the apparatus, a height of the main body of the apparatus is increased, resulting in increased size of the apparatus.

This invention has been developed to provide an image recording apparatus having a reduced size.

The present invention provides an image recording apparatus, comprising: a housing; an image recording portion held by the housing and configured to record an image on a recording medium; a control board having a mounting face and disposed in the housing such that the mounting face extends along a perpendicular plane that is perpendicular to a height direction of the image recording apparatus, a control circuit for controlling operations of the image recording portion being provided on the control board; and a communication board having a mounting face and disposed in the housing such that the mounting face of the communication board extends along the perpendicular plane, such that the communication board is located distant from the control board in a direction along the perpendicular plane, and such that at least a portion of the communication board is located within a height range ranging to the control board from a distal end of a highest one of mounted components mounted on the control board, an interface circuit to be connected to a telephone line being provided on the communication board.

In the image recording apparatus constructed as described above, at least a portion of the communication board is located within the height range ranging to the control board from the distal end of the highest one of the mounted components mounted on the control board. Thus, the communication board can be disposed in the housing without an increase in height of the housing.

In the image recording apparatus, it is possible to achieve reduction in size of the image recording apparatus.

BRIEF DESCRIPTION OF THE DRAWINGS

The objects, features, advantages, and technical and industrial significance of the present invention will be better understood by reading the following detailed description of the embodiment of the invention, when considered in connection with the accompanying drawings, in which:

FIGS. 11A and 11B are views showing a control board 90 and a communication board 70 in a second modification, wherein FIG. 11A is a plan view therefor, and FIG. 11B is a front elevational view therefor.

DETAILED DESCRIPTION OF THE EMBODIMENT

Figure 1:
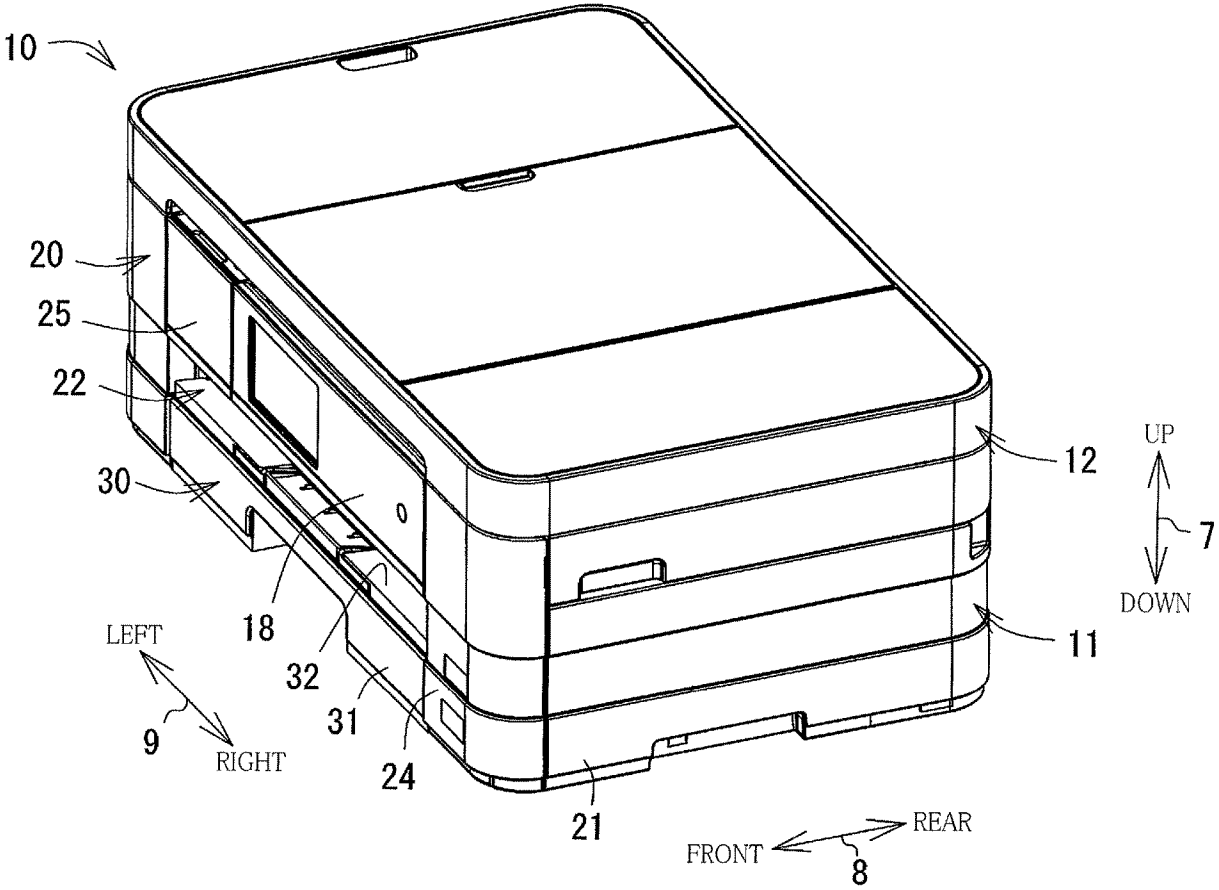
FIG. 1 is an external perspective view showing an image recording apparatus 10 with a scanning section 12 being closed.

Hereinafter, there will be described an embodiment of the present invention by reference to the drawings. It is to be understood that the following embodiment is described only by way of example, and the invention may be otherwise embodied with various modifications without departing from the scope and spirit of the invention. In the following explanation, there will be expressed (a) an up and down direction 7 on the basis of a state in which an image recording apparatus 10 is normally used or placed (i.e., a state of the image recording apparatus 10 in FIG. 1), (b) a front and rear direction 8 by regarding a side of the image recording apparatus 10 on which an operation panel 18 is provided as a front side, and (c) a right and left direction 9 in a state in which the image recording apparatus 10 is seen from the front side thereof. Further, each of terms "up" ("upward") and "down" ("downward") used in the following explanation mean sides or directions in the up and down direction 7. Each of terms "front" ("frontward") and "rear" ("rearward") used in the following explanation mean sides or directions in the front and rear direction 8. Each of terms "right" ("rightward") and "left" ("leftward") used in the following explanation mean sides or directions in the right and left direction 9.

<Overall Construction of Image Recording Apparatus 10>

Figure 3A:
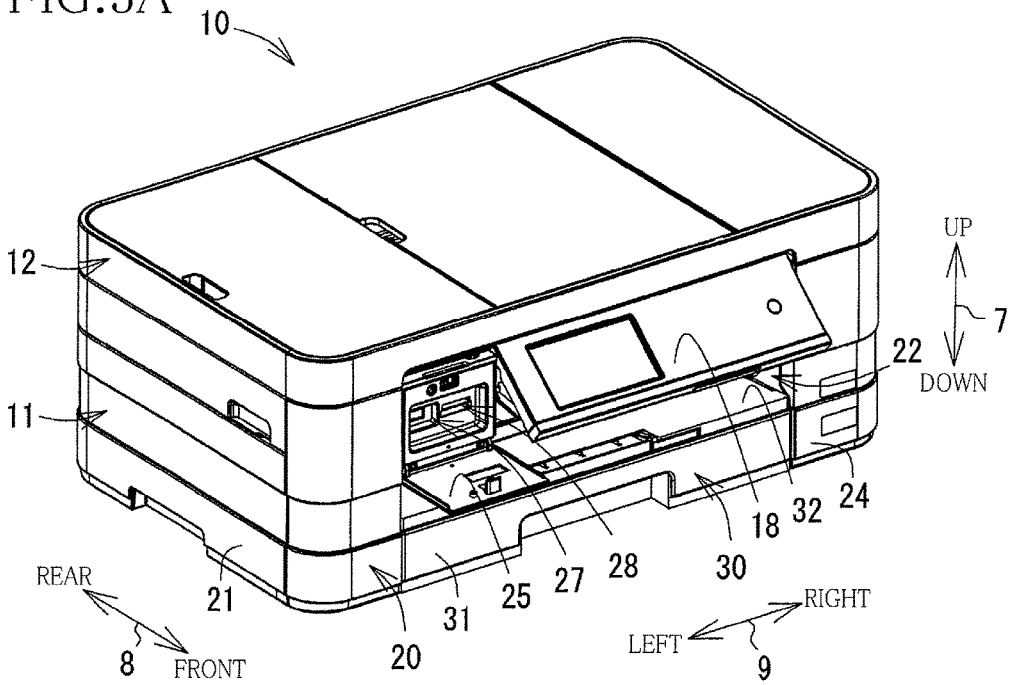
FIG. 3A is an external perspective view showing the image recording apparatus 10 with a connector panel 25 being open.
Figure 3B:
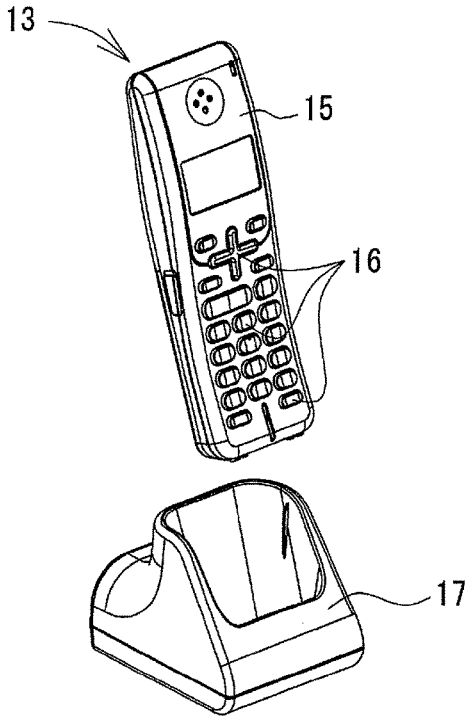
FIG. 3B is an external perspective view showing a telephone 13.

As shown in FIG. 1, the image recording apparatus 10 includes: a printing section 11 configured to record an image on a recording medium in the form of a sheet 6 (see FIG. 4) such as a recording sheet, a glossy sheet, and a postcard sheet; a scanning section 12 configured to read or capture an image recorded on a document, not shown; and a telecommunications device in the form of a telephone 13 (see FIG. 3B). The image recording apparatus 10 has various functions such as a printing function, a scanning function, a copying function, and a facsimile function, and a telephone conversation function.

<Scanning Section 12>

The scanning section 12 (as one example of a cover) is disposed on the printing section 11 and supported by the printing section 11 so as to be pivotable about a rear end portion or a rear end (as an axis) of the printing section 11. The scanning section 12 is pivoted by a user so as to take a closed posture (as one example of a first posture) shown in FIG. 1 or an open posture (as one example of a second posture) shown in FIG. 2, for example. The scanning section 12 being in the open posture is supported by a support arm 14. When the scanning section 12 is in the open posture, a first path 35 and a second path 36 are exposed to an outside of the image recording apparatus 10. When the scanning section 12 is in the closed posture, the first path 35 and the second path 36 are covered by the scanning section 12. A detailed explanation of this structure will be explained below.

<Telephone 13>

The telephone 13 shown in FIG. 3B is used for a telephone conversation via a telephone line. The telephone 13 includes: a phone body 15; a plurality of operation buttons 16 exposed to the outside respectively from a plurality of windows formed on the phone body 15; and a circuit board, not shown, disposed in the phone body 15. Mounted on this circuit board are a microphone for converting sound waves (voice) to electric signals (voice signals) and a speaker for converting voice signals to a voice. The telephone 13 uses an antenna provided on the circuit board to perform wireless communication with the printing section 11. The telephone 13 is placed or mounted on a phone mount 17.

<Overall Construction of Printing Section 11>

Figure 4:
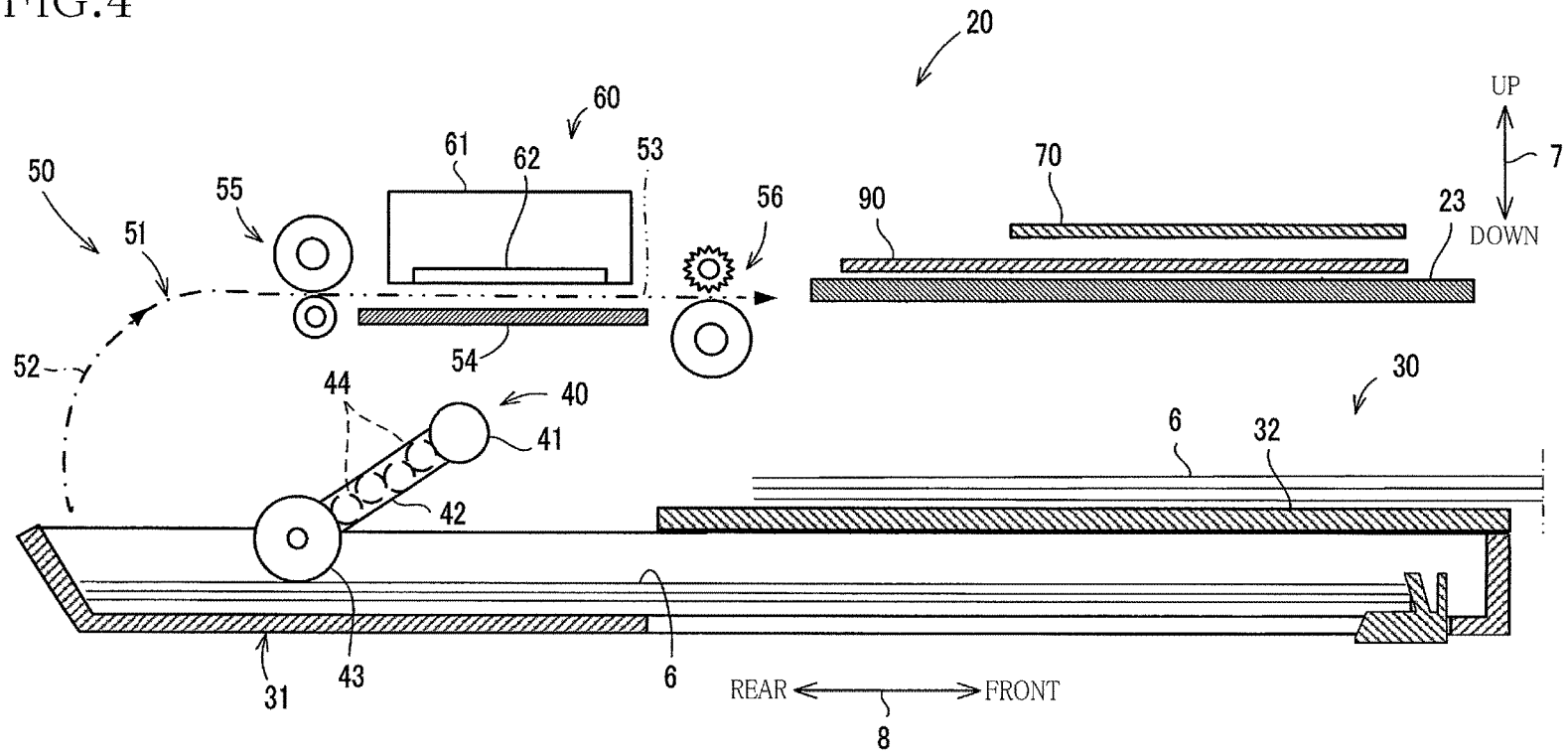
FIG. 4 is an elevational view in vertical cross section schematically showing the image recording apparatus 10.

As shown in FIG. 1, the printing section 11 includes: a main body 20; and a sheet-supply cassette 30 accommodated in a lower portion of the main body 20. As shown in FIG. 4, the main body 20 (as one example of an image recording portion) includes: a supply portion 40 configured to supply the sheet 6 from the sheet-supply cassette 30; a conveyance portion 50 configured to convey the supplied sheet 6; a recording portion 60 configured to record an image on the conveyed sheet 6; and a housing 21 (see FIG. 1) for supporting or holding these components. There will be explained components of the printing section 11.

<Housing 21>

As shown in FIG. 1, the housing 21 has an opening 22 formed in a front face thereof, and the sheet-supply cassette 30 is inserted and removed through this opening 22. On a rear side of the opening 22, rail portions, not shown, are provided for supporting the sheet-supply cassette 30 slidably in the front and rear direction 8.

The housing 21 includes a support plate 23 (see FIG. 4) serving as an upper face for defining a space in which the sheet-supply cassette 30 is disposed. A control board 90 and a communication board 70 which will be described below are disposed on or on an upper side of the support plate 23.

The housing 21 includes a recessed portion, not shown, over the opening 22. The operation panel 18 is fitted in this recessed portion. Provided on the recessed portion is a support portion for supporting an upper end portion of the operation panel 18 such that the operation panel 18 is pivotable. The operation panel 18 has a display screen whose position is changed by the pivotal movement of the operation panel 18 by the user.

The housing 21 includes a cover 24 provided on a right side of the opening 22. The cover 24 is pivotable about its lower end portion. A cartridge mount 64 (see FIG. 5) is disposed on a rear side of the cover 24 and on a lower side of the support plate 23 (see FIG. 4). When the cover 24 is opened, the cartridge mount 64 is exposed to the outside. Ink cartridges 65 respectively storing inks of respective colors are accommodated in the cartridge mount 64.

Figure 9:
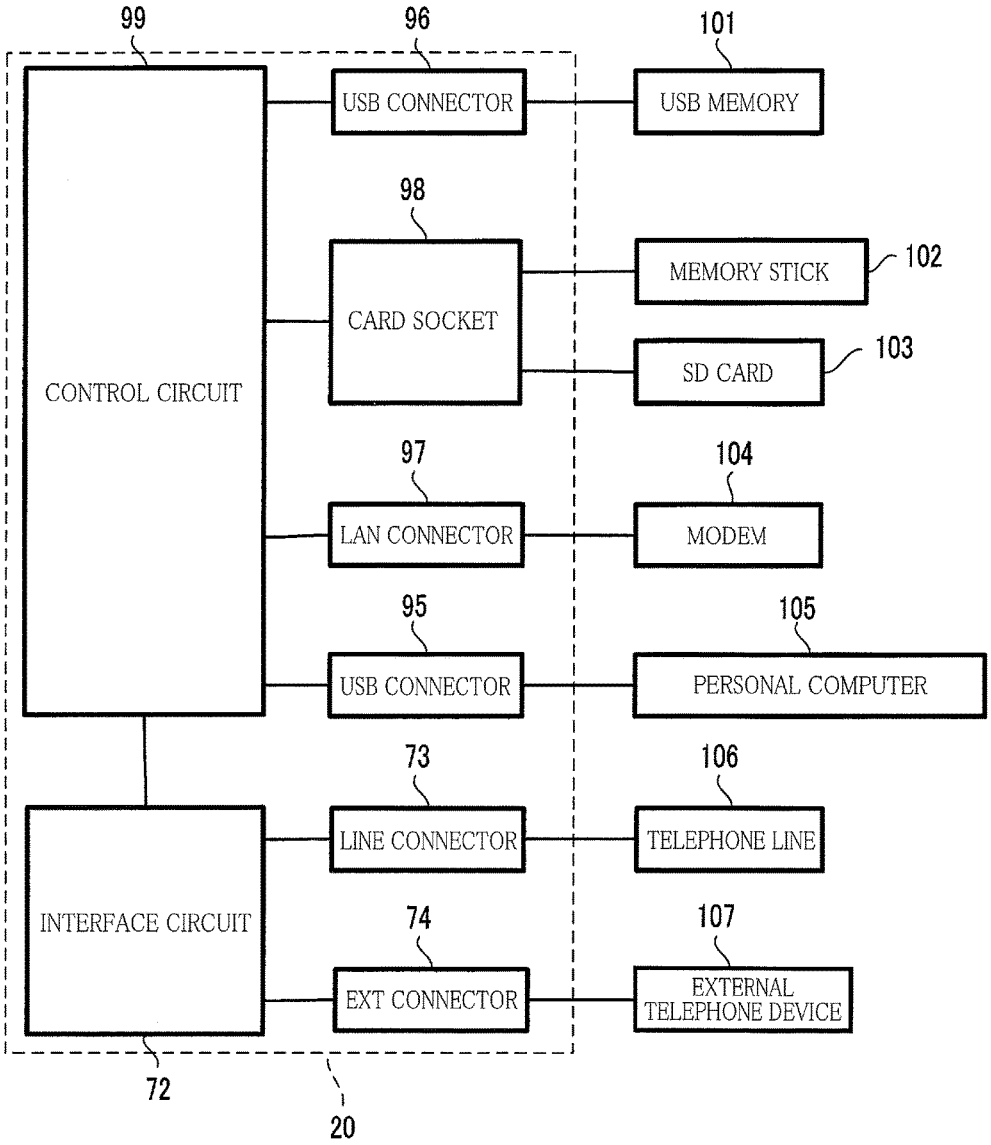
FIG. 9 is a block diagram showing a configuration of the image recording apparatus 10.

As shown in FIG. 1, the housing 21 includes a connector panel 25 provided on a left side of the operation panel 18. The connector panel 25 is pivotable about its lower end portion. As shown in FIG. 3A, a first insertion opening 27 and a second insertion opening 28 are formed in an inner front face of the connector panel 25. When the connector panel 25 is opened by the user, a USB connector 96 and a card socket 98 which will be described below are exposed respectively from the first insertion opening 27 and the second insertion opening 28 to the outside. A USB memory™ 101 shown in FIG. 9 is mounted in the USB connector (port) 96 by the user. A storage medium such as a SD card™ 103 and a memory stick™ 102 is mounted in the card socket 98 by the user.

Figure 2:
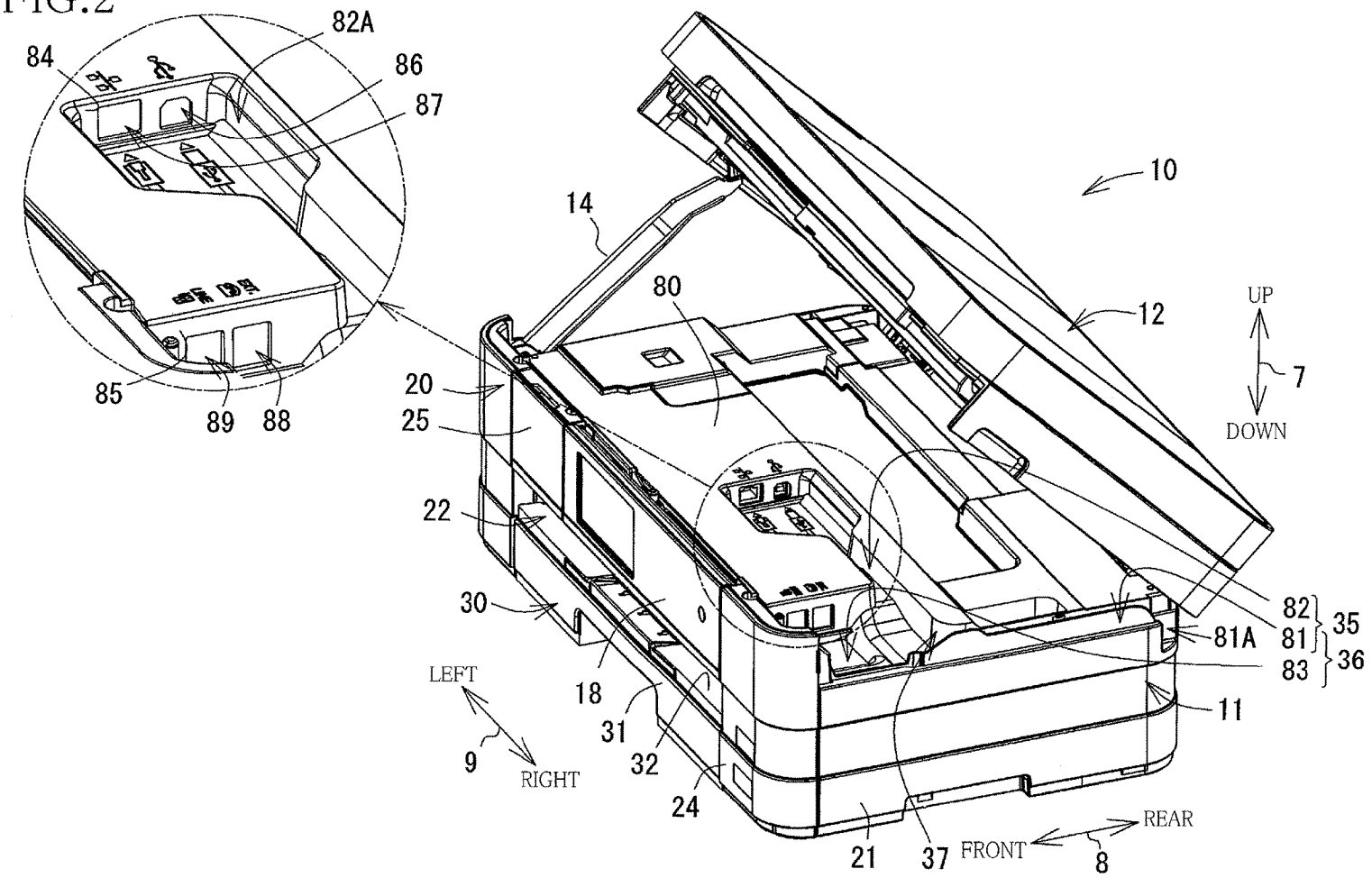
FIG. 2 is an external perspective view showing the image recording apparatus 10 with a scanning section 12 being open.

As shown in FIG. 2, the housing 21 includes a cover 80 functioning as an upper wall or an upper plate. The cover 80 will be explained below in detail.

<Sheet-supply Cassette 30>

As shown in FIG. 4, the sheet-supply cassette 30 includes: a main tray 31 on which the sheet(s) 6 not recorded is or are stacked; and a sheet-discharge tray 32 on which the recorded sheet(s) 6 is or are stacked. As shown in FIG. 1, the sheet-supply cassette 30 is disposed in the lower portion of the main body 20 at a position on a rear side of the opening 22 and located adjacent to the cartridge mount 64 in the right and left direction 9 (as one example of a direction perpendicular to a height direction). The sheet-supply cassette 30 is supported by the rail portions provided on the housing 21 so as to be slidable in the front and rear direction 8.

<Supply Portion 40>

As shown in FIG. 4, the supply portion 40 includes: a support shaft 41 rotatably supported by a frame, not shown; an arm 42 pivotably supported at its one end portion by the support shaft 41; and a supply roller 43 rotatably supported by the other end portion of the arm 42. A plurality of gears 44 are provided in the arm 42 for transmitting the rotation of the support shaft 41 to the supply roller 43. When the support shaft 41 has been rotated by a drive motor, not shown, the arm 42 is pivoted about the support shaft 41 by a frictional force therebetween, causing the supply roller 43 to be brought into contact with an uppermost one of the sheets 6 stacked on the main tray 31. This stops the pivotal movement of the arm 42, and the supply roller 43 rotated by the support shaft 41 via the gears 44 supplies the sheet 6 into a conveyance path 51.

<Conveyance Portion 50>

As shown in FIG. 4, the conveyance portion 50 includes: guide members, not shown, and a platen 54 for defining the conveyance path 51; a conveyance roller pair 55; and a sheet-discharge roller pair 56. The conveyance path 51 includes: a curved path 52 indicated by a one-dot chain line; and a straight path 53 indicated by a two-dot chain line. The curved path 52 curves upward from an upper end of a rear end of the main tray 31 as a start end. The straight path 53 extends straight from a terminal end of the curved path 52 in a frontward direction. The platen 54 is disposed on an upper side of a rear portion of the sheet-supply cassette 30 so as to function as a part of a lower face defining the straight path 53. The image is recorded on the sheet 6 on the platen 54.

The conveyance roller pair 55 is disposed on a rear side of the platen 54 in the front and rear direction 8. The conveyance roller pair 55 is driven and rotated by a drive motor, not shown, to nip the sheet 6 in the conveyance path 51 and convey the sheet 6 in a conveyance direction indicated by arrows in FIG. 4.

The sheet-discharge roller pair 56 is provided on a front side of the platen 54. The sheet-discharge roller pair 56 is driven and rotated by the drive motor, not shown, to nip the sheet 6 in the conveyance path 51 and convey the sheet 6 in the conveyance direction.

The sheet 6 is conveyed intermittently on the platen 54 by the conveyance roller pair 55 and the sheet-discharge roller pair 56, during which the image is recorded by the recording portion 60. The sheet 6 on which the image has been recorded is discharged onto the sheet-discharge tray 32 by the sheet-discharge roller pair 56.

<Recording Portion 60>

Figure 5:
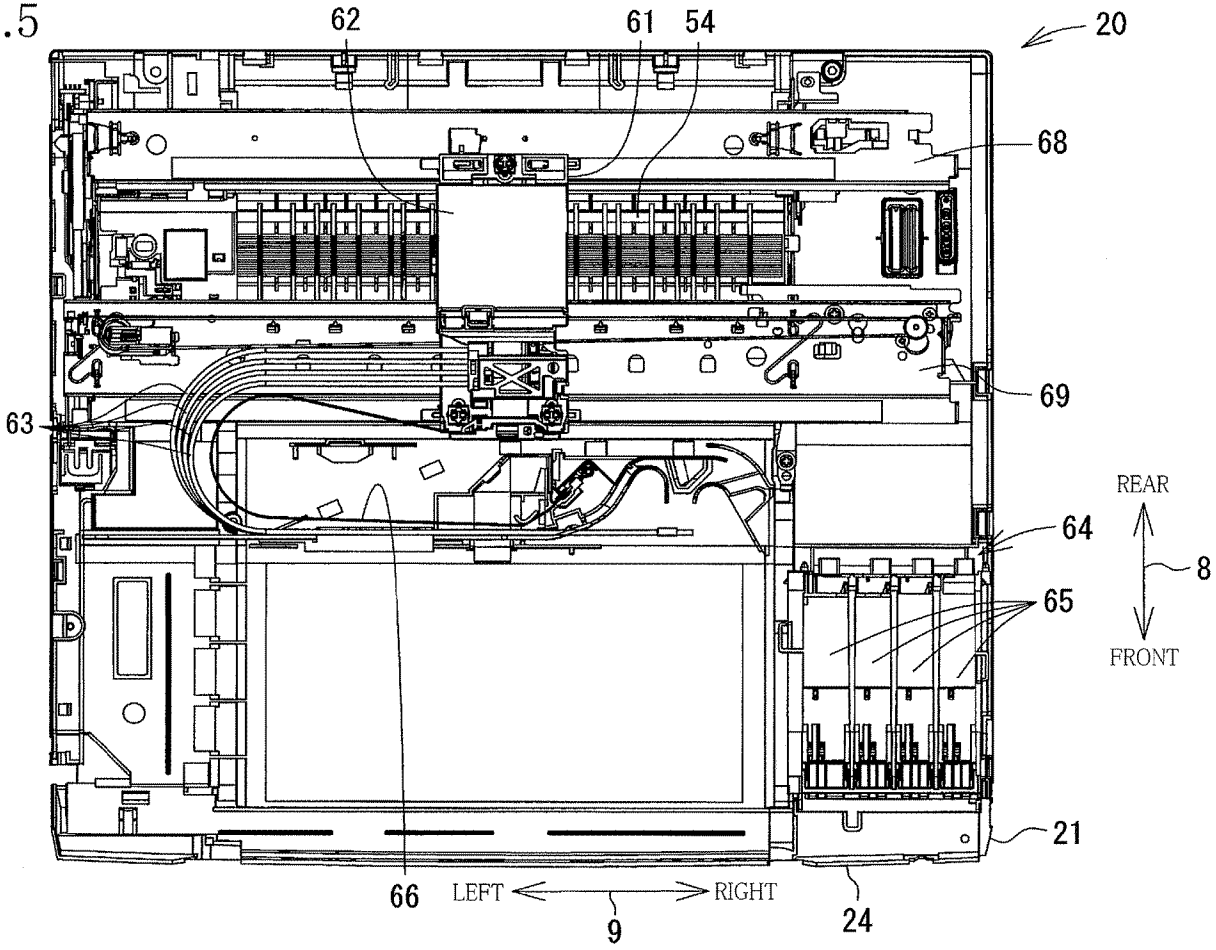
FIG. 5 is a plan view showing a lower portion of a main body 20.

As shown in FIG. 4, the recording portion 60 includes: a carriage 61 disposed above the platen 54; and a recording head 62 mounted on the carriage 61. As shown in FIG. 5, the carriage 61 is supported on guide rails 68, 69 and reciprocated by a drive motor, not shown, in the right and left direction 9.

One end of each of tubes 63 and a cable 66 is connected to the recording head 62. The other end of each tube 63 is connected to the cartridge mount 64. The other end of the cable 66 is connected to the control board 90 (see FIG. 8). When the ink cartridges 65 have been mounted on the cartridge mount 64, the inks respectively stored in the ink cartridges 65 are supplied to the recording head 62 via the respective tubes 63. The recording head 62 ejects droplets of the supplied inks onto the sheet 6 on the platen 54.

<Cover 80>

Figure 7:
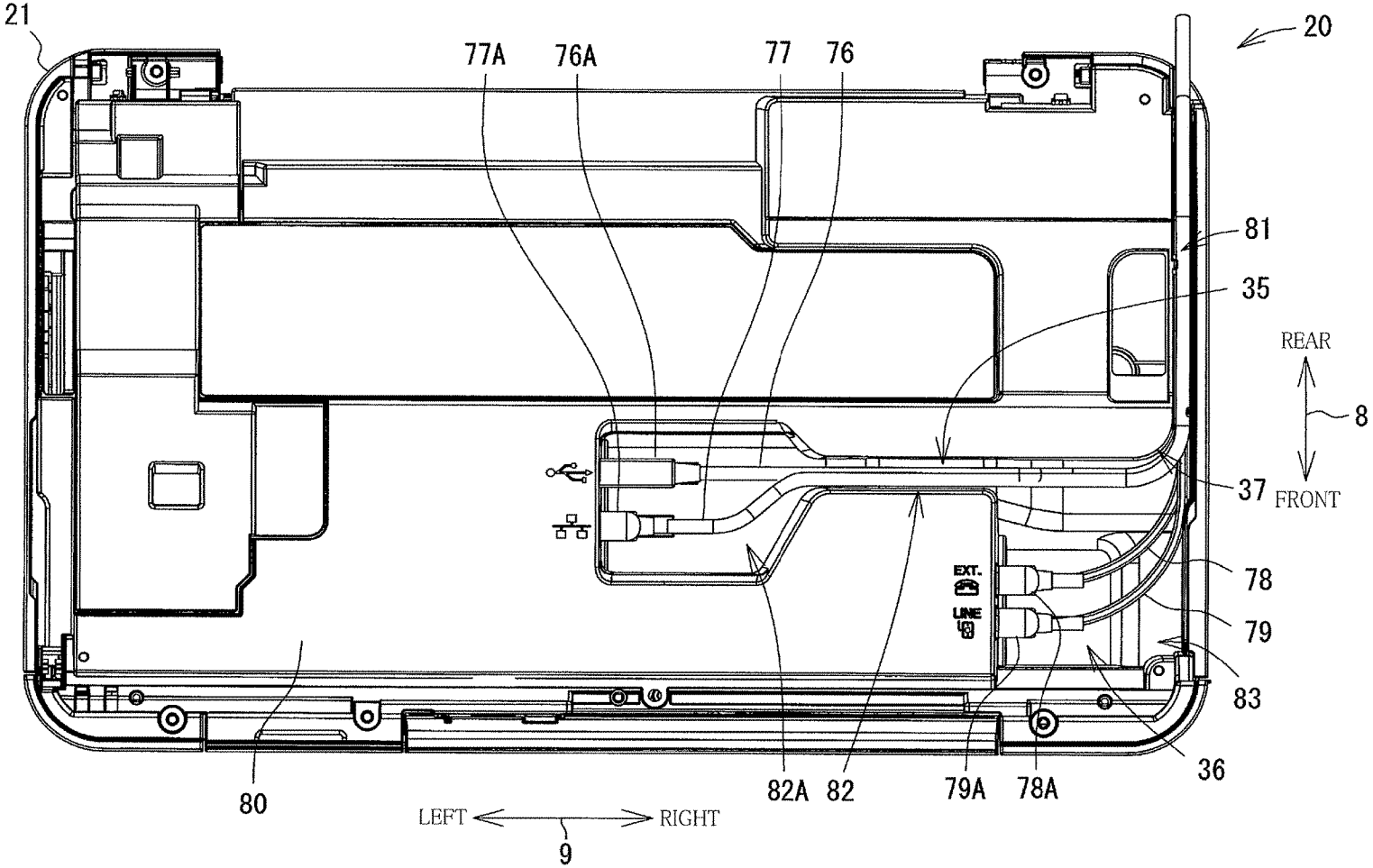
FIG. 7 is a plan view showing the main body 20.

As shown in FIG. 2, the cover 80 has a plate-like shape as its outer shape and is formed of a synthetic resin. The cover 80 constitutes the upper wall of the housing 21. The cover 80 is mounted in the housing 21 by being fitted into the housing 21 from an upper side thereof Recesses and openings are formed in portions of an upper face of the cover 80. At portions of the cover 80 other than the portions thereof in which the openings are formed, the cover 80 covers the components thereunder such as the recording portion 60 and the conveyance portion 50 such that these components are not exposed to the outside. The cover 80 includes a first grooved recess 81, a second grooved recess 82, and a third grooved recess 83 formed in the upper face of the cover 80. The first path 35 is constituted by the first grooved recess 81 and the second grooved recess 82, and the second path 36 is constituted by the first grooved recess 81 and the third grooved recess 83. As shown in FIG. 7, a USB cable 76 and a LAN cable 77 are disposed in the first path 35, and two telephone cables 78, 79 are disposed in the second path 36. The USB cable 76, the LAN cable 77, and the two telephone cables 78, 79 are positioned on the cover 80 by the first path 35 and the second path 36.

The first grooved recess 81 is formed in a right end portion of the cover 80 so as to extend in the front and rear direction 8. The first grooved recess 81 extends to a third opening 81A (as one example of an end near an edge) formed in an upper end portion of a rear face of the housing 21. A width of the first grooved recess 81 (i.e., a length thereof in the right and left direction 9) and a depth thereof (i.e., a length thereof in the up and down direction 7) are set such that the USB cable 76, the LAN cable 77, and the two telephone cables 78, 79 can be disposed in the first grooved recess 81. The USB cable 76, the LAN cable 77, and the two telephone cables 78, 79 are routed from the third opening 81 A toward a rear side of the housing 21.

The second grooved recess 82 extends in the right and left direction 9 from a central portion of the first grooved recess 81 in the front and rear direction 8 to a central portion of the cover 80 in the right and left direction 9. A width of the second grooved recess 82 (i.e., a length thereof in the right and left direction 9) and a depth thereof (i.e., a length thereof in the up and down direction 7) are set such that the USB cable 76 and the LAN cable 77 can be disposed in the second grooved recess 82.

The third grooved recess 83 extends in the right and left direction 9 from a front end portion of the first grooved recess 81. A width of the third grooved recess 83 (i.e., a length thereof in the right and left direction 9) and a depth thereof (i.e., a length thereof in the up and down direction 7) are set such that the two telephone cables 78, 79 can be disposed in the third grooved recess 83. That is, the second grooved recess 82 and the third grooved recess 83 are joined together at the front end portion of the first grooved recess 81 so as to be connected to the first grooved recess 81. As a result, the first path 35 and the second path 36 are combined with each other.

The first path 35 and the second path 36 are curved at a meeting area at which the first grooved recess 81, the second grooved recess 82, and the third grooved recess 83 are merged with one another. This meeting area may be hereinafter called a curved portion 37. As shown in FIG. 8C, a depth of each grooved recess in the curved portion 37 is deeper than a depth of each grooved recess in the other portions of the first path 35 (i.e., a portion thereof extending in the right and left direction 9, the portion including a portion of the second grooved recess 82 which includes a wide portion 82A). This prevents the USB cable 76 and the LAN cable 77 curved or bent in the curved portion 37 from extending off from the first path 35 to an outside thereof by elasticities of the USB cable 76 and the LAN cable 77. It is noted that, in the present embodiment, since the first path 35 extends from the central portion of the cover 80 to the right end portion thereof in the right and left direction 9, the first path 35 needs to be curved at the front end portion of the first grooved recess 81. However, the curved portion 37 may be formed in the second path 36 as long as the second path 36 is suitably arranged.

As shown in FIGS. 2 and 7, the length of the third grooved recess 83 in the right and left direction 9 is shorter than that of the second grooved recess 82 in the right and left direction 9. Thus, a left wall 85 defining a left end of the third grooved recess 83 is located on a right side of a left wall 84 defining a left end of the second grooved recess 82. Openings are formed in these left walls 84, 85 for exposing connectors which will be explained in detail.

In the left wall 84 of the cover 80, two first openings 86, 87 are formed so as to be next to each other in the front and rear direction 8. The rear first opening 86 exposes a USB connector (port) 95 mounted on the control board 90 (see FIG. 8A) to the outside. The front first opening 87 exposes a LAN connector (port) 97 mounted on the control board 90 to the outside. That is, the USB connector 95 and the LAN connector 97 are arranged next to each other in the front and rear direction 8. A connector 76A provided on one end of the USB cable 76 is connected to the USB connector 95. The other end of the USB cable 76 is connected to an external device such as a personal computer 105 (see FIG. 9). A connector 77A provided on one end of the LAN cable 77 is connected to the LAN connector 97. The other end of the LAN cable 77 is connected to a modem 104 (or a router).

In the left wall 85 of the cover 80, two second openings 88, 89 are formed so as to be next to each other in the front and rear direction 8. The rear second opening 88 exposes a LINE connector (port) 73 mounted on the communication board 70 (see FIG. 8A) to the outside. The front second opening 89 exposes an EXT connector (port) 74 mounted on the communication board 70 to the outside. That is, LINE connector 73 and the EXT connector 74 are arranged next to each other in the front and rear direction 8. Connectors 78A, 79A provided on ends of the respective telephone cables 78, 79 are respectively connected to the LINE connector 73 and the EXT connector 74. The other end of the telephone cable 78 whose one end is connected to the LINE connector 73 is connected to a telephone line 106 (see FIG. 9). The other end of the telephone cable 79 whose one end is connected to the EXT connector 74 is connected to an external telephone device 107 (see FIG. 9). The cover 80 provided over the first openings 86, 87 and the second openings 88, 89 enables the user to connect the USB cable 76 and the LAN cable 77, and the telephone cables 78, 79 respectively to the control board 90 and the communication board 70 from the outside while keeping the user from touching the control board 90 and the communication board 70.

To facilitate the connection of the connector 76A of the USB cable 76 and the connector 77A of the LAN cable 77 respectively to the USB connector 95 and the LAN connector 97, a left portion or the wide portion 82A of the second grooved recess 82 is wider than a right portion of the second grooved recess 82 (that is, a length of the wide portion 82A of the second grooved recess 82 is longer in the front and rear direction 8 than the right portion of the second grooved recess 82). Further, the wide portion 82A near the connectors 95, 97 in the right and left direction 9 is greater in length in the front and rear direction 8 than a portion of the second grooved recess 82 far from the connectors 95, 97 (i.e., the second grooved recess 82 other than the wide portion 82A). Further, to facilitate the connection of the connectors 78A, 79A of the respective telephone cables 78, 79 respectively to the LINE connector 73 and the EXT connector 74, the third grooved recess 83 has generally the same width as that of the wide portion 82A of the second grooved recess 82 (that is, the length of the third grooved recess 83 is generally the same in the front and rear direction 8 as that of the wide portion 82A).

<Control Board 90>

As shown in FIG. 4, the control board 90 is placed on the support plate 23 so as to be located right over the sheet-supply cassette 30, under the cover 80, and on a front side of the recording portion 60 in the front and rear direction 8. The control board 90 is disposed such that a mounting face 93 thereof faces upward and extends or expands along an imaginary plane that is perpendicular to the up and down direction 7 (as one example of the height direction).

As shown in FIG. 8, a microcomputer 91 and various mounted components 92 are mounted on the control board 90. The mounted components 92 include resistances, diodes, condensers, and coils. The microcomputer 91 serves as a control circuit 99 (see FIG. 9) for controlling the driving of the drive motors, not shown, the recording head 62, the scanning section 12, and the like.

The USB connectors 95, 96, the LAN connector 97, and the card socket 98 are mounted on the control board 90.

The USB connector 95 (as one example of a first connector, see FIG. 8A) is disposed on a left side of the first opening 86 (see FIG. 2) in the right and left direction 9. The LAN connector 97 (as one example of a third connector, see FIG. 8A) is disposed on a left side of the first opening 87 (see FIG. 2) in the right and left direction 9. The USB connector 95 and the LAN connector 97 are disposed such that a connecting portion (insertion opening) of the USB connector 95 to which the connector 76A of the USB cable 76 (see FIG. 7) is to be connected faces rightward in the right and left direction 9 and such that a connecting portion (insertion opening) of the LAN connector 97 to which the connector 77A of the LAN cable 77 (see FIG. 7) is to be connected faces rightward in the right and left direction 9.

Figure 6:
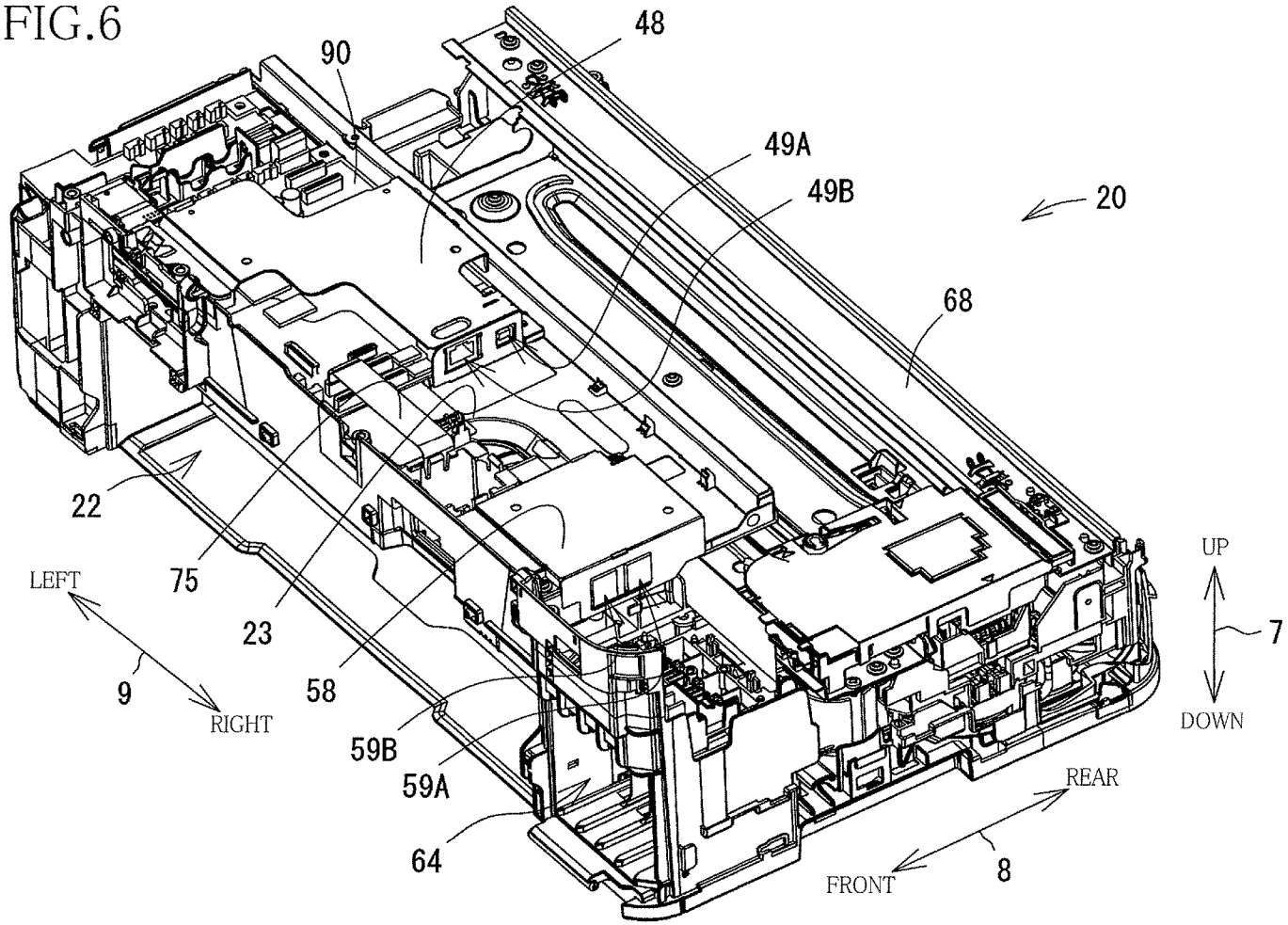
FIG. 6 is a perspective view showing an inside of the main body 20.

As shown in FIG. 6, the USB connector 95 and the LAN connector 97 are covered with a shield member 48. The shield member 48 is provided by a bent metal plate such as an iron plate and disposed over the control board 90 (on a side of the control board 90 on which the mounting face 93 is located). The shield member 48 is provided for magnetic shielding.

The shield member 48 has first windows 49A, 49B opening therein. The first window 49A is provided on a right side of the USB connector 95 in the right and left direction 9. The first window 49B is provided on a right side of the LAN connector 97 in the right and left direction 9. The connector 76A of the USB cable 76 is connected to the USB connector 95 through the first opening 86 of the cover 80 and the first window 49A of the shield member 48. The connector 77A of the LAN cable 77 is connected to the LAN connector 97 through the first opening 87 of the cover 80 and the first window 49B of the shield member 48.

As described above, the USB connector 95 and the LAN connector 97 are disposed so as to face rightward in the right and left direction 9. That is, the USB connector 95 and the LAN connector 97 are disposed so as to face in a direction other than a direction toward the pivotal axis of the scanning section 12. In other words, the portion of the housing 21 constituting the pivotal axis of the scanning section 12 does not exist on a line (extension line) extended from the connectors 95, 97 in the direction in which the connectors 95, 97 face. It is noted that the direction in which the connectors 95, 97 face and the pivotal axis of the scanning section 12 are parallel to each other. Thus, when the connector 76A of the USB cable 76 and the connector 77A of the LAN cable 77 are respectively connected to the USB connector 95 and the LAN connector 97 from a right side thereof in the right and left direction 9, the scanning section 12 never interferes with the connecting operation by the user.

The USB connector 96 is disposed on a rear side of the first insertion opening 27 (FIG. 3A) in the front and rear direction 8. The USB connector 96 is disposed such that a connecting portion of the USB connector 96 to which the USB memory™ 101 is to be connected faces frontward in the front and rear direction 8.

The card socket 98 is disposed on a rear side of the second insertion opening 28 (FIG. 3A) in the front and rear direction 8. The card socket 98 includes two slots arranged in the up and down direction 7. The SD card™ 103 is inserted into one of the slots. The memory stick™ 102 is inserted into the other of the slots. The card socket 98 is disposed such that the slots face frontward in the front and rear direction 8.

One end of a connecting cable 75 is connected to the control board 90. The other end of the connecting cable 75 is connected to the communication board 70.

<Communication Board 70>

Figure 8A:
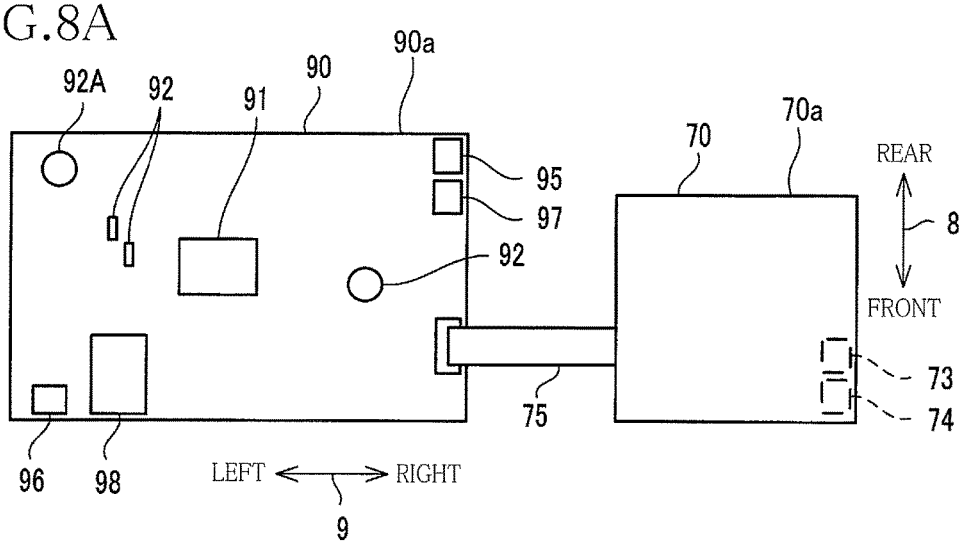
FIG. 8A is a plan view schematically showing a control board 90 and a communication board 70.
Figure 8B:
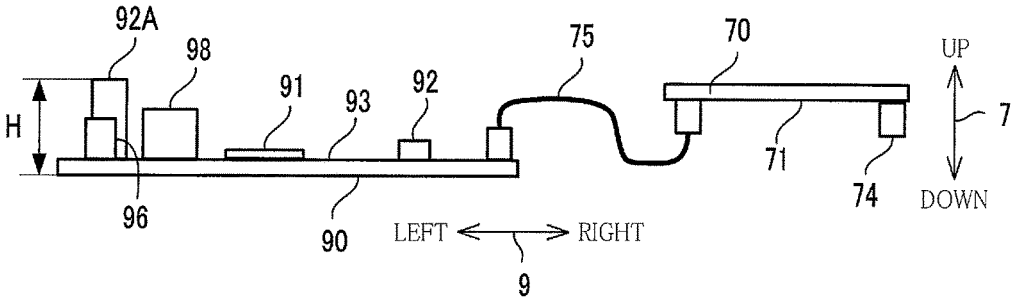
FIG. 8B is a front elevational view schematically showing the control board 90 and the communication board 70.
Figure 8C:
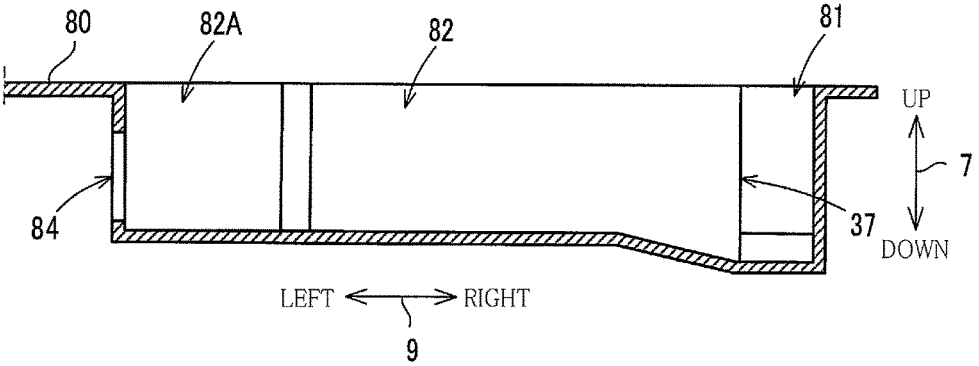
FIG. 8C is an elevational view in vertical cross section showing a portion of a cover 80 in which the second grooved recess 82 is formed.

As shown in FIGS. 8A and 8B, the communication board 70 is disposed on a right side of the control board 90 in the right and left direction 9 so as to be spaced apart from the control board 90. As shown in FIG. 6 in detail, an entirety of a shield member 58 (which will be described below) disposed over the communication board 70 is disposed on a right side of an entirety of the shield member 48 disposed over the control board 90 in the right and left direction 9. This means that an entirety of the communication board 70 is disposed on a right side of an entirety of the control board 90 in the right and left direction 9 so as to be spaced apart from the entirety of the control board 90. The USB connector 95 and the LAN connector 97 are mounted on the right end portion of the control board 90, and the entirety of the communication board 70 is disposed on a right side of the entirety of the control board 90 in the right and left direction 9 so as to be spaced apart from the entirety of the control board 90 (that is, the entirety of the communication board 70 is located at a position not overlapping the entirety of the control board 90 in the right and left direction 9 in plan view), thereby preventing the communication board 70 from interfering with the connecting operation by the user when the connector 76A of the USB cable 76 and the connector 77A of the LAN cable 77 are respectively connected to the USB connector 95 and the LAN connector 97 from a right side thereof in the right and left direction 9. Further, as shown in FIGS. 6 and 8A, 8B, the communication board 70 is formed and disposed such that a rear end portion 70a of the communication board 70 is located on a front side of a rear end portion 90a of the control board 90a. As shown in FIGS. 6 and 8A, 8B, positions of the USB connector 95 and the LAN connector 97 in the control board 90 in the front and rear direction 8 are located at a rear portion of the control board 90. Accordingly, when the USB cable 76 and the LAN cable 77 are respectively mounted onto the USB connector 95 and the LAN connector 97 from a right side thereof, the communication board 70 does not interfere with the connecting operation by the user. Further, the communication board 70 is located under the cover 80 (see FIG. 2) and right over the cartridge mount 64 (see FIG. 5). Since the communication board 70 is disposed at this position, it is possible to prevent the ink from adhering to the communication board 70 even if the ink has leaked from the ink cartridge 65 mounted on the cartridge mount 64. For example, even if a nonconforming ink cartridge has been forcibly pressed into the cartridge mount 64, and the ink has leaked from the ink cartridges 65, the ink never contacts the communication board 70.

The communication board 70 is disposed such that a mounting face 71 thereof extends along the imaginary plane that is perpendicular to the up and down direction 7. Further, the communication board 70 is disposed within a height range H that is from a distal end of the highest (tallest) one of the mounted components 92 mounted on the control board 90, i.e., a mounted component 92A, to the control board 90. The mounted component 92A is a large-capacitance electrolytic condenser (capacitor), for example. Since the communication board 70 is disposed in such a position, it is possible to reduce the height of the housing 21 when compared with a case where the communication board 70 is disposed in a lower portion of the housing 21.

The communication board 70 is disposed at a position above the control board 90 such that the mounting face 71 faces downward. Since the mounting face 71 of the communication board 70 and the mounting face 93 of the control board 90 respectively face downward and upward, and the height position of the communication board 70 is higher than that of the control board 90, it is easy for the user to draw or route the connecting cable 75 that is for electrically connecting between the control board 90 and the communication board 70.

Mounted on the communication board 70 are various electronic components, not shown, for providing an interface circuit 72 (see FIG. 9) that is for connecting between the control circuit 99 and the telephone line 106. The other end of the connecting cable 75 whose one end is connected to the control board 90 is connected to the communication board 70. The interface circuit 72 and the control circuit 99 are electrically connected to each other by the connecting cable 75.

Further, the LINE connector 73 (as one example of a second connector) and the EXT connector 74 (as one example of a fourth connector) are mounted on the communication board 70. The LINE connector 73 and the EXT connector 74 are electrically connected to the interface circuit 72 by electric circuit patterns.

The LINE connector 73 is disposed on a left side of the second opening 88 (see FIG. 2) in the right and left direction 9. The EXT connector 74 is disposed on a left side of the second opening 89 (see FIG. 2) in the right and left direction 9. The LINE connector 73 and the EXT connector 74 are disposed such that their respective connecting portions to which the connectors 78A, 79A of the respective telephone cables 78, 79 (see FIG. 7) are respectively to be connected face rightward in the right and left direction 9.

As shown in FIG. 6, the LINE connector 73 and the EXT connector 74 are covered with the shield member 58. The shield member 58 is provided by a bent metal plate and disposed over the communication board 70. The shield member 58 is provided for magnetic shielding.

The shield member 58 has second windows 59A, 59B opening therein. The second window 59A is provided on a right side of the LINE connector 73 in the right and left direction 9. The second window 59B is provided on a right side of the EXT connector 74 in the right and left direction 9. The connector 78A of the telephone cable 78 is connected to the LINE connector 73 through the second opening 88 of the cover 80 and the second window 59A of the shield member 58. The connector 79A of the telephone cable 79 is connected to the EXT connector 74 through the second opening 89 of the cover 80 and the second window 59B of the shield member 58. The interface circuit 72 is electrically connected to the telephone line 106 (see FIG. 9) via the LINE connector 73 and the telephone cable 78 and electrically connected to the external telephone device 107 (see FIG. 9) via the EXT connector 74 and the telephone cable 79.

As described above, the LINE connector 73 and the EXT connector 74 are disposed so as to face rightward in the right and left direction 9. That is, the LINE connector 73 and the EXT connector 74 are disposed so as to face in a direction other than a direction toward the pivotal axis of the scanning section 12. In other words, the portion of the housing 21 constituting the pivotal axis does not exist on the line extended from the connectors 95, 97 in the direction in which the connectors 95, 97 face. Thus, when the connectors 78A, 79A of the respective telephone cables 78, 79 are respectively connected to the LINE connector 73 and the EXT connector 74 from a right side thereof in the right and left direction 9, the scanning section 12 never interferes with the connecting operation by the user.

As described above, all the USB connector 95, the LAN connector 97, the LINE connector 73, and the EXT connector 74 are disposed so as to face in the same direction (i.e., rightward in the right and left direction 9). Thus, it is possible for the user to connect each of the connectors to a corresponding one of the LINE connector 73, the EXT connector 74, the USB connector 95, and the LAN connector 97 without changing a direction in which the user is looking.

Further, the LINE connector 73 and the EXT connector 74 are disposed at positions different from the positions of the USB connector 95 and the LAN connector 97 in the front and rear direction 8 (as one example of a first direction or a second direction) and in the right and left direction 9 (as one example of the second direction or the first direction). Thus, when the user connects the connector 76A of the USB cable 76 and the connector 77A of the LAN cable 77 respectively to the USB connector 95 and the LAN connector 97, the telephone cables 78, 79 do not interfere with the connecting operation by the user. Further, when the user connects the connectors 78A, 79A of the respective telephone cables 78, 79 respectively to the LINE connector 73 and the EXT connector 74, the USB cable 76 and the LAN cable 77 do not interfere with the connecting operation by the user.

<Operations>

There will be next explained operations of the user. First, there will be explained operations of the user for mounting the storage media such as the USB memory™ 101, the SD card™ 103, and the memory stick™ 102 shown in FIG. 9 onto (into) the image recording apparatus 10. The user initially opens the connector panel 25 (see FIG. 3A) to expose the USB connector 96 and the card socket 98. The user then connects the USB memory™ 101 to the USB connector 96 through the first insertion opening 27. Further, the user inserts the storage medium such as the SD card™ 103 and the memory stick™ 102 into the slot of the card socket 98 through the second insertion opening 28.

Then, routing operations for routing or drawing the USB cable 76, the LAN cable 77, and the two telephone cables 78, 79 are explained with reference to FIGS. 2 and 7. It is noted that there will be explained a case where the USB cable 76, the LAN cable 77, the telephone cable 78, and the telephone cable 79 are routed in this order, but the order of the routing may be changed.

The user initially opens the scanning section 12 to expose the cover 80. The user then connects the connector 76A of the USB cable 76 to the USB connector 95 (FIG. 8A) through the first opening 86 and the first window 49A. The user then places the one end portion of the USB cable 76 in the first path 35. As a result, the USB cable 76 is curved along the first path 35 in the curved portion 37. The USB cable 76 whose one end portion is disposed in the first path 35 is routed rearward from the third opening 81A. The other end of the USB cable 76 is connected to the personal computer 105 (see FIG. 9). It is noted that, after placing the one end portion of the USB cable 76 in the first path 35, the user may connect the connector 76A of the USB cable 76 to the USB connector 95.

The user then connects the connector 77A of the LAN cable 77 to the LAN connector 97 (FIG. 8A) through the first opening 87 and the first window 49B. The user then places the one end portion of the LAN cable 77 in the first path 35. As a result, the LAN cable 77 is curved along the first path 35 in the curved portion 37. The LAN cable 77 whose one end portion is disposed in the first path 35 is routed rearward from the third opening 81A. The other end of the LAN cable 77 is connected to the modem 104 (see FIG. 9). It is noted that, after placing the one end portion of the LAN cable 77 in the first path 35, the user may connect the connector 77A of the LAN cable 77 to the LAN connector 97.

The user then connects the connector 78A of the telephone cable 78 to the LINE connector 73 (FIG. 8A) through the second opening 88 and the second window 59A. The user then curves the telephone cable 78 rearward at a position near the second opening 88 and places the one end portion of the telephone cable 78 in the second path 36. The telephone cable 78 whose one end portion is disposed in the second path 36 is routed rearward from the third opening 81A. The other end of the telephone cable 78 is connected to the telephone line 106 (see FIG. 9). It is noted that, after placing the one end portion of the telephone cable 78 in the second path 36, the user may connect the connector 78A of the telephone cable 78 to the LINE connector 73.

The user then connects the connector 79A of the telephone cable 79 to the EXT connector 74 through the second opening 89 and the second window 59B. The user then curves the telephone cable 79 rearward at a position near the second opening 89 and places the one end portion of the telephone cable 79 in the second path 36. The telephone cable 79 whose one end portion is disposed in the second path 36 is routed rearward from the third opening 81A. The other end of the telephone cable 79 is connected to the external telephone device 107 (see FIG. 9). It is noted that, after placing the one end portion of the telephone cable 79 in the second path 36, the user may connect the connector 79A of the telephone cable 79 to the EXT connector 74.

<Effects of Embodiment>

In the present embodiment, the communication board 70 is disposed such that the mounting face 71 extends along the imaginary plane that is perpendicular to the up and down direction 7 and such that the communication board 70 is located within the height range H between the control board 90 and the mounted component 92A that is the highest or tallest one of the mounted components 92 mounted on the control board 90. Accordingly, it is possible to reduce the height of the housing 21 when compared with the case where the communication board 70 is disposed in the lower portion of the housing 21. Thus, it is possible to achieve reduction in size of the image recording apparatus 10.

In the present embodiment, the communication board 70 is disposed adjacent to the control board 90 in the right and left direction 9. Thus, it is possible to shorten the connecting cable 75 when compared with the case where the communication board 70 is disposed in the lower portion of the housing 21.

In the present embodiment, the communication board 70 is disposed just above the cartridge mount 64. This prevents the ink having leaked from the ink cartridge 65 from adhering to the communication board 70.

In the present embodiment, the control board 90 is disposed in a front portion of the housing 21 in the front and rear direction 8 to expose the USB connector 96 and the card socket 98 mounted on the control board 90 to the outside from the front face of the image recording apparatus 10. Thus, the USB connector 95 and the LAN connector 97 mounted on the control board 90 are located in a central portion of the housing 21 in the front and rear direction 8 and distant from the rear face of the housing 21. Meanwhile, a configuration in which the USB cable 76 and the LAN cable 77 are drawn rearward from the rear face of the housing 21 gives the user a good usability. Therefore, the USB cable 76 and the LAN cable 77 are routed on the cover 80. In the present embodiment, the USB cable 76 and the LAN cable 77 can be positioned on the cover 80 by the first path 35 provided on the cover 80, facilitating the routing operation of the USB cable 76 and the LAN cable 77 by the user. Further, the telephone cables 78, 79 can be positioned by the second path 36 provided on the cover 80, facilitating the routing operation of the telephone cables 78, 79.

In the present embodiment, the USB cable 76, the LAN cable 77 and the telephone cables 78, 79 are disposed in the first grooved recess 81. This first grooved recess 81 extends in the front and rear direction 8. Thus, even if a load in a direction perpendicular to the front and rear direction 8 has been accidentally applied to the USB cable 76, the LAN cable 77, and/or the telephone cables 78, 79, this load is not directly applied to the USB connector 95, the LAN connector 97, the LINE connector 73, and/or the EXT connector 74. This prevents damages to or breakages of the USB connector 95, the LAN connector 97, the LINE connector 73, the EXT connector 74, and the connectors 76A, 77A, 78A, 79A to be connected thereto.

In the present embodiment, the curved portion 37 is provided in the first path 35. Thus, it is possible to prevent the USB cable 76, the LAN cable 77, and/or the telephone cables 78, 79 from being disconnected respectively from the USB connector 95, the LAN connector 97, the LINE connector 73, and/or the EXT connector 74 if the USB cable 76, the LAN cable 77, and/or the telephone cables 78, 79 have been erroneously pulled rearward in the front and rear direction 8.

In the present embodiment, the depth of each grooved recess in the curved portion 37 is deeper than the depth of each grooved recess in the other portions of the first path 35 and the second path 36. This makes it possible to prevent the USB cable 76 and the LAN cable 77 curved or bent in the curved portion 37 from moving off the first path 35. This facilitates the routing operation of the USB cable 76, the LAN cable 77, and the telephone cables 78, 79.

In the present embodiment, the first path 35 is constituted by the first grooved recess 81 and the second grooved recess 82, and the second path 36 is constituted by the first grooved recess 81 and the third grooved recess 83. That is, the first path 35 and the second path 36 share the first grooved recess 81. This simplifies the construction of the cover 80 when compared with a case where the first path 35 and the second path 36 are separated from each other. Further, the USB cable 76, the LAN cable 77, and the telephone cables 78, 79 can be drawn rearward from the housing 21 together with one another, facilitating the routing operation.

In the present embodiment, the first path 35 and the second path 36 are covered with the scanning section 12 being in the closed posture. Thus, it is possible to cover the USB cable 76, the LAN cable 77, and the telephone cables 78, 79 disposed on the first path 35 and the second path 36 with the scanning section 12.

In the present embodiment, all the USB connector 95, the LAN connector 97, the LINE connector 73, and the EXT connector 74 are disposed so as to face in the same direction (i.e., rightward in the right and left direction 9) and so as to face in a direction other than the direction toward the pivotal axis of the scanning section 12. Thus, the user can connect each of the connectors 76A, 77A, 78A, 79A to the corresponding one of the USB connector 95, the LAN connector 97, the LINE connector 73, and the EXT connector 74 without changing the direction in which the user is looking, and the scanning section 12 does not interfere with the connecting operation of the user. This facilitates the operation by the user for connecting the connectors 76A, 77A, 78A, 79A respectively to the USB connector 95, the LAN connector 97, the LINE connector 73, and the EXT connector 74.

In the present embodiment, the wide portion 82A is formed in the second grooved recess 82, and the width of the third grooved recess 83 is made generally the same as that of the wide portion 82A. This facilitates the operation by the user for connecting the connectors 76A, 77A, 78A, 79A respectively to the USB connector 95, the LAN connector 97, the LINE connector 73, and the EXT connector 74.

<First Modification>

Figure 10:
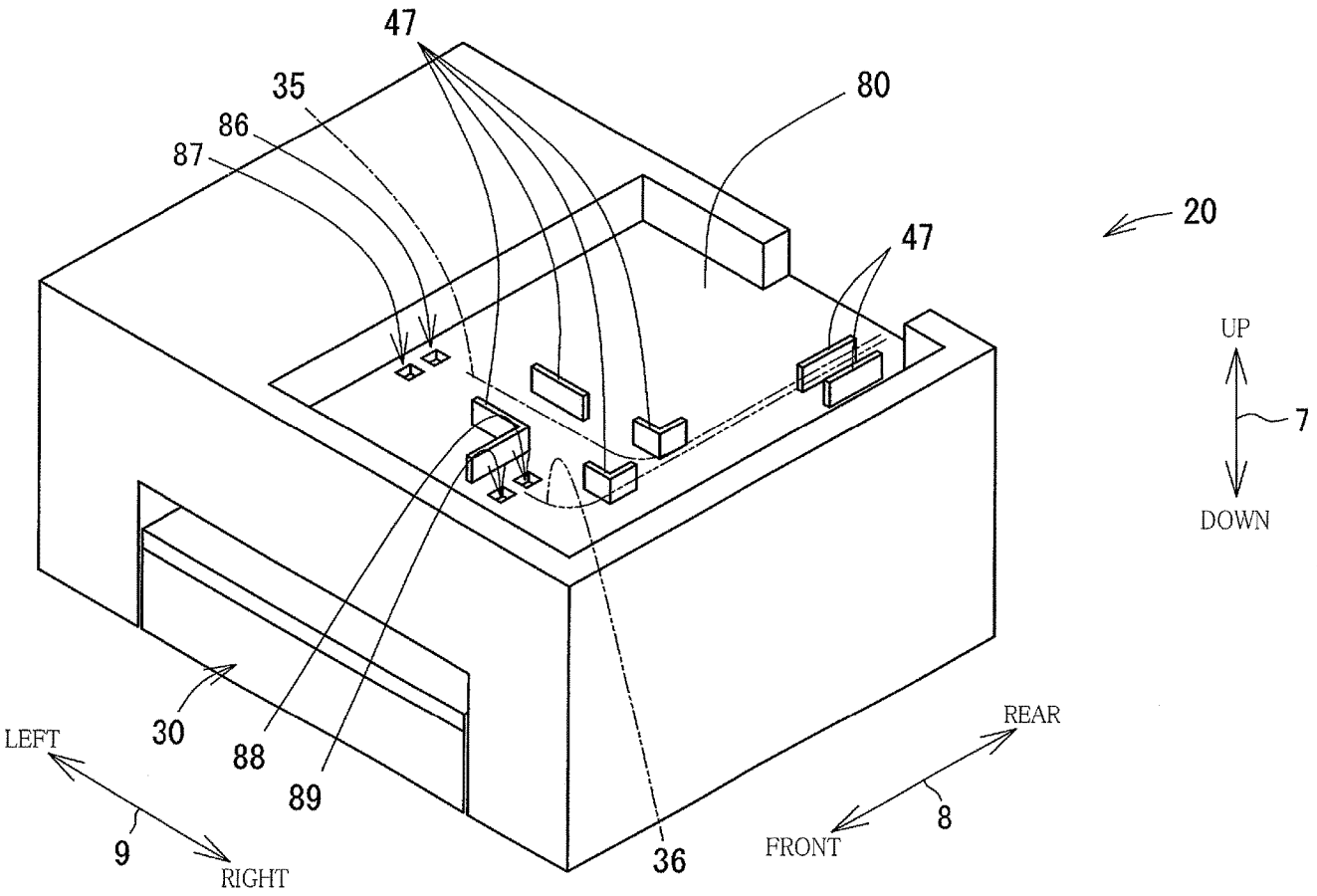
FIG. 10 is a perspective view schematically showing a main body 20 in a first modification.

In the above-described embodiment, the first path 35 and the second path 36 are defined by the first grooved recess 81, the second grooved recess 82, and the third grooved recess 83. As shown in FIG. 10, this modification is configured such that the first path 35 and the second path 36 are defined by a plurality of ribs 47.

Each of the first openings 86, 87 and the second openings 88, 89 is formed in the cover 80 so as to extend through the cover 80 in the up and down direction 7. The respective positions of the first openings 86, 87 and the second openings 88, 89 in the front and rear direction 8 and in the right and left direction 9 are the same as those in the above-described embodiment.

Instead of the first grooved recess 81, the second grooved recess 82, and the third grooved recess 83, the cover 80 includes the ribs 47 projecting upward from the upper face of the cover 80. The ribs 47 are provided along the first path 35 indicated by a one-dot chain line and the second path 36 indicated by a two-dot chain line.

The USB connector 95 and the LAN connector 97 are mounted on the control board 90 such that the respective connecting portions of the USB connector 95 and the LAN connector 97 to which the respective connectors 76A, 77A (see FIG. 7) are to be connected face upward. Likewise, the LINE connector 73 and the EXT connector 74 are mounted on the communication board 70 such that the respective connecting portions of the LINE connector 73 and the EXT connector 74 to which the respective connectors 78A, 79A (see FIG. 7) are to be connected face upward. The other constructions of this modification are the same as those of the above-described embodiment.

Also in this modification in which the first path 35 and the second path 36 are defined by the ribs 47, it is possible to route or draw the USB cable 76, the LAN cable 77, and the telephone cables 78, 79 as in the above-described embodiment, facilitating the routing operation.

<Second Modification>

Figure 11A:
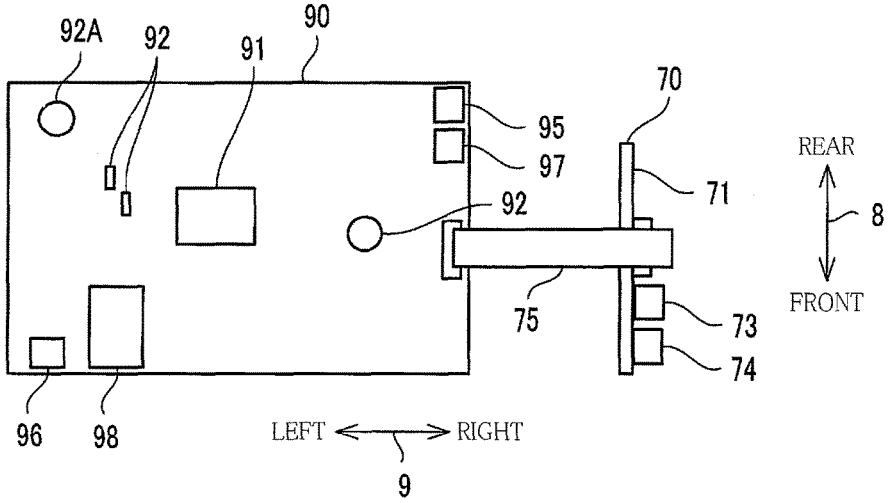
Figure 11B:
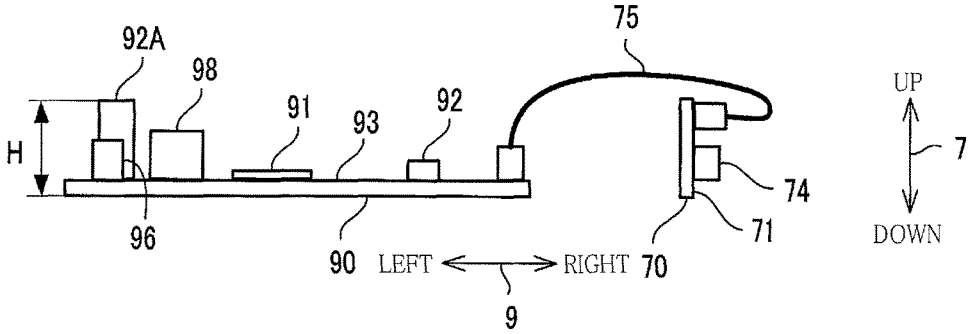

In the above-described embodiment, the communication board 70 is disposed such that the mounting face 71 extends along the imaginary plane that is perpendicular to the up and down direction 7. As shown in FIGS. 11A and 11B, in this modification, the communication board 70 is disposed such that the mounting face 71 extends or expands along the up and down direction 7 and the front and rear direction 8 (i.e., along an imaginary plane perpendicular to the right and left direction 9).

The communication board 70 is disposed on a right side of the control board 90 in the right and left direction 9 so as to be spaced apart from the control board 90. Further, the communication board 70 is disposed such that the mounting face 71 faces rightward in the right and left direction 9. The LINE connector 73 and the EXT connector 74 are disposed such that their respective connecting portions to which the connectors 78A, 79A (see FIG. 7) are respectively to be connected face rightward in the right and left direction 9. The communication board 70 is disposed such that the LINE connector 73 and the EXT connector 74 are located at the same height position as that of the USB connector 95 and the LAN connector 97 and exposed through the respective second openings 88, 89 to the outside. The other constructions of this modification are the same as those of the above-described embodiment.

In this modification, the communication board 70 is disposed such that the LINE connector 73 and the EXT connector 74 are located at the same height position as that of the USB connector 95 and the LAN connector 97. Thus, at least a portion of the communication board 70 is located within the height range H ranging or extending from the highest or tallest mounted component 92A to the control board 90. This makes it possible to reduce the height of the housing 21 when compared with the case where the communication board 70 is disposed in the lower portion of the housing 21. Further, this modification achieves a smaller width of the housing 21 (i.e., a smaller length thereof in the right and left direction 9) when compared with the above-described embodiment in which the communication board 70 is mounted horizontally. Thus, it is possible to reduce the size of the image recording apparatus 10.

<Other Modifications>

In the above-described embodiment, the first path 35 and the second path 36 are covered with the scanning section 12. However, a cover pivotable to cover the first path 35 and the second path 36 or expose the first path 35 and the second path 36 may be provided. In this case, the cover is provided between the cover 80 and the scanning section 12 or provided instead of the scanning section 12.

In the above-described embodiment, the scanning section 12 is pivotable about the rear end portion of the printing section 11 in the front and rear direction 8. However, the scanning section 12 may be provided so as to be pivotable about a left end portion or a right end portion of the printing section 11 in the right and left direction 9.

In the above-described embodiment, the control board 90 is disposed such that the mounting face 93 faces upward, and the communication board 70 is disposed such that the mounting face 71 faces downward. However, the control board 90 may be disposed such that the mounting face 93 faces downward, and the communication board 70 may be disposed such that the mounting face 71 faces upward.

In the above-described embodiment, the communication board 70 and the control board 90 are disposed such that the communication board 70 is located above the height level of the control board 90. However, the communication board 70 and the control board 90 may be disposed such that the communication board 70 is located below the height level of the control board 90. Further, the communication board 70 and the control board 90 may be disposed such that the communication board 70 is located at the same height level as the control board 90.

In the above-described embodiment, the control board 90 and the communication board 70 are disposed just over the sheet-supply cassette 30 and the cartridge mount 64, respectively. However, the control board 90 and the communication board 70 may be disposed just over the cartridge mount 64 and the sheet-supply cassette 30, respectively. Further, the communication board 70 and the control board 90 may be disposed under the cartridge mount 64.

In the above-described embodiment, the communication board 70 and the control board 90 are disposed in the front portion of the housing 21 in the front and rear direction 8. However, where the USB connector 96 and the card socket 98 are not provided in the control board 90, the communication board 70 and the control board 90 may be disposed in a rear portion of the housing 21 in the front and rear direction 8.

In the above-described embodiment, the LINE connector 73 and the EXT connector 74, and the USB connector 95 and the LAN connector 97 are disposed at different positions in the front and rear direction 8 and in the right and left direction 9. However, the LINE connector 73 and the EXT connector 74, and the USB connector 95 and the LAN connector 97 may be disposed at different positions only in the front and rear direction 8 or only in the right and left direction 9.

In the above-described embodiment, all the USB connector 95, the LAN connector 97, the LINE connector 73, and the EXT connector 74 are disposed so as to face in the same direction. However, the USB connector 95, the LAN connector 97, the LINE connector 73, and the EXT connector 74 may be disposed so as to face in different directions.

In the above-described embodiment, the USB connector 95, the LAN connector 97, the LINE connector 73, and the EXT connector 74 are disposed so as to face in a direction other than the direction toward the pivotal axis of the scanning section 12. However, the USB connector 95, the LAN connector 97, the LINE connector 73, and the EXT connector 74 may be disposed so as to face toward the pivotal axis of the scanning section 12.

In the above-described embodiment, the first path 35 and the second path 36 share the first grooved recess 81 (that is, the first grooved recess 81 is a common part for the first path 35 and the second path 36). However, the first path 35 and the second path 36 may be provided separately.

In the above-described embodiment, the USB connector 95 and the LAN connector 97 are mounted on the control board 90, and the LINE connector 73 and the EXT connector 74 are mounted on the communication board 70. However, only the USB connector 95 or only the LAN connector 97 may be mounted on the control board 90, and only the LINE connector 73 may be mounted on the communication board 70.

In the above-described embodiment, the USB connector 96 and the card socket 98 are mounted on the control board 90. However, only the USB connector 96 or only the card socket 98 may be mounted on the control board 90, and the USB connector 96 and the card socket 98 may not be mounted on the control board 90.

In the above-described embodiment, the depth of each grooved recess in the curved portion 37 of the first path 35 and the second path 36 is deeper than the depth of each grooved recess in the other portions. However, the depth of each grooved recess in the curved portion 37 may be equal to or shallower than the depth of each grooved recess in the other portions.

In the above-described embodiment, the first openings 86, 87 respectively for exposing the USB connector 95 and the LAN connector 97 and the second openings 88, 78 respectively for exposing the LINE connector 73 and the EXT connector 74 are provided in the cover 80 constituting the upper wall of the housing 21. However, at least ones of the first openings 86, 87 and the second openings 88, 89 may not be provided in the cover 80. Further, at least ones of the first openings 86, 87 and the second openings 88, 89 may be provided in a component other than the cover 80 constituting the upper wall of the housing 21. Further, the housing 21 may not include the cover 80 functioning as the upper wall. In this alternative construction, the USB connector 95 and the LINE connector 73 may be configured to be exposed to the outside when the scanning section 12 is in the open posture.

What is claimed is:

1. An image recording apparatus, comprising:

a housing;

an image [recording portion] *recorder* held by the housing and configured to record an image on a recording medium;

a control board having a mounting face and disposed in the housing such that the mounting face extends along a perpendicular plane that is perpendicular to a height direction of the image recording apparatus, a control circuit for controlling operations of the image [recording portion] *recorder* being provided on the control board; and a communication board having a mounting face and disposed in the housing such that the mounting face of the communication board extends along the perpendicular plane, such that the communication board is located distant from the control board in a direction along the perpendicular plane, and such that at least a portion of the communication board is located within a height range ranging to the control board from a distal end of a highest one of mounted components mounted on the control board, an interface circuit to be connected to a telephone line being provided on the communication board.

2. The image recording apparatus according to claim 1, wherein the image [recording portion] *recorder* includes:

a cartridge mount on which an ink cartridge is mountable;

a tube having one end connected to the cartridge mount;

a recording head to which the other end of the tube is connected, the recording head being configured to eject, onto the recording medium, ink supplied from the ink cartridge via the tube, and wherein the communication board is disposed above a height level of the cartridge mount.

3. The image recording apparatus according to claim 1, further comprising:

a first connector mounted on the control board and connectable to the other end of a cable whose one end is connected to an external device; and a second connector mounted on the communication board and connectable to a telephone cable, wherein the housing includes an upper wall having: a first opening for exposing the first connector; and a second opening for exposing the second connector.

4. The image recording apparatus according to claim 3, wherein the housing includes:

a first path extending on the upper wall from the first opening to an edge of the upper wall, the cable being to be disposed in the first path; and a second path extending from the second opening to an end of the first path which is located at the edge of the upper wall, the telephone cable being to be disposed in the second path.

5. The image recording apparatus according to claim 3, wherein the first connector and the second connector are disposed so as to face in the same direction.

6. The image recording apparatus according to claim 3, wherein the first connector and the second connector are disposed at respective positions different from each other in both of a first direction perpendicular to the height direction and a second direction that is perpendicular to the height direction and the first direction.

7. The image recording apparatus according to claim 3, wherein the first connector is a USB connector, wherein a third connector is mounted on the control board at a position next to the first connector, a connector of a LAN cable being to be connected to the third connector, and wherein a fourth connector is mounted on the communication board at a position next to the second connector so as to be connected to the interface circuit, the other end of the telephone cable whose one end connected to an external telephone device being to be connected to the fourth connector.

8. The image recording apparatus according to claim 2, comprising a tray disposed adjacent to the cartridge mount in a direction perpendicular to the height direction, the recording medium is to be placed on the tray, wherein the control board is disposed on an upper side of the tray, and wherein the communication board is disposed on an upper side of the cartridge mount.

9. The image recording apparatus according to claim 4, wherein the second path merges with the first path at a position in the first path between the first opening and the end of the first path which is located at the edge of the upper wall, and extends to the end of the first path which is located at the edge of the upper wall.

10. The image recording apparatus according to claim 4, further comprising a cover pivotable so as to take (i) a first posture in which the cover covers the first path and the second path and (ii) a second posture in which the first path and the second path are exposed to an outside of the image recording apparatus.

11. The image recording apparatus according to claim 10, wherein the cover is provided so as to be pivotable about an end portion of the housing in a direction perpendicular to the height direction, and wherein the first connector and the second connector are disposed so as to face in one or respective ones of directions other than a direction toward the end portion.

12. The image recording apparatus according to claim 4, wherein each of the first path and the second path is constituted by a grooved recess formed in an upper face of the upper wall, wherein at least one of the first path and the second path includes a curved portion, and wherein a depth of a grooved recess in the curved portion is deeper than a depth of a grooved recess in the other portions of the at least one of the first path and the second path.

13. The image recording apparatus according to claim 4, wherein each of the first path and the second path is constituted by a grooved recess formed in an upper face of the upper wall, and wherein each of a portion of the first path which is near the first opening and a portion of the second path which is near the second opening has a greater width than that of the other portions of the first path and the second path.

14. The image recording apparatus according to claim 1, wherein the communication board is disposed such that an entirety thereof is located at a position different from an entirety of the control board in a first direction perpendicular to the height direction.

15. The image recording apparatus according to claim 1, further comprising:

a first connector mounted on the control board and connectable to the other end of a cable whose one end is connected to an external device; and a second connector mounted on the communication board and connectable to a telephone cable, wherein the first connector and the second connector are disposed so as to face in the same direction, wherein the first connector is provided on a downstream portion of the control board in a second direction that is perpendicular to the height direction and a first direction perpendicular to the height direction, and wherein a downstream end of the communication board in the second direction is located on an upstream side of a downstream end of the control board in the second direction.

16. An image recording apparatus, comprising:

a housing;

an image [recording portion] *recorder* held by the housing and configured to record an image on a recording medium;

a first connector mounted on a control board and connectable to the other end of a cable whose one end is connected to an external device, the control board including a control circuit for controlling operations of the image [recording portion] *recorder*;

a second connector mounted on a communication board having an interface circuit, the second connector being connected to the interface circuit and connectable to a telephone cable; and a cover pivotable about one of opposite end portions of the housing in a first direction perpendicular to a height direction of the image recording apparatus, so as to take (i) a first posture in which the cover covers the first connector and the second connector from an upper side thereof and (ii) a second posture in which the first connector and the second connector are exposed to an outside of the image recording apparatus, wherein the first connector and the second connector are disposed at respective positions nearer to the other of the opposite end portions of the housing than to the one of the opposite end portions of the housing, and disposed at respective positions different from each other in at least one of the first direction and a second direction that is perpendicular to the height direction and the first direction.

*17. An image recording apparatus, comprising:*

*a housing;*

*an image recorder held by the housing and configured to record an image on a recording medium;*

*a control board having a mounting face and disposed in the housing such that the mounting face extends along a perpendicular plane that is perpendicular to a particular direction, a control circuit for controlling operations of the image recorder being provided on the control board;*

*a communication board having a mounting face and disposed in the housing such that the mounting face of the communication board extends along the perpendicular plane, the communication board being located distant from the control board in a direction along the perpendicular plane;*

*a mounted component mounted on the communication board, the communication board and the mounted component being arranged within an arrangement range in the particular direction, the arrangement range ranging to the control board from a protruding end of a most protruding one of mounted components mounted on the control board, an interface circuit to be connected to a telephone line being provided on the communication board;*

*a first connector mounted on the control board and connectable to the other end of a cable whose one end is connected to an external device; and*

*a second connector mounted on the communication board and connectable to a telephone cable,*

*wherein the housing includes a cover which has: a first opening for exposing the first connector; and a second opening for exposing the second connector,*

*wherein the cover includes a recessed portion recessed toward an inside of the housing in the particular direction, and*

*wherein the first opening and the second opening are formed through a bottom of the recessed portion of the cover in the particular direction perpendicular to the perpendicular plane along which the mounting face of the control board and the mounting face of the communication board extend.*

*18. The image recording apparatus according to claim 17, further comprising a connecting cable that connects between the control board and the communication board,*

*wherein the connecting cable is disposed within the arrangement range.*

* * * * *